United States Patent [19]

Papp

[11] Patent Number: 4,461,379

[45] Date of Patent: Jul. 24, 1984

[54] PALLET CONVEYOR

[75] Inventor: Alan M. Papp, Eastlake, Ohio

[73] Assignee: Litton Industrial Products, Inc., Cleveland, Ohio

[21] Appl. No.: 414,067

[22] Filed: Sep. 2, 1982

[51] Int. Cl.$^3$ .............................................. B65G 37/00
[52] U.S. Cl. ................................ 198/472; 104/172 B
[58] Field of Search ............................... 198/472, 648; 104/172 B, 172 R; 198/606, 817

[56]  References Cited

U.S. PATENT DOCUMENTS

| 2,602,196 | 7/1952 | Pelton | 104/172 B |
| 2,742,863 | 4/1956 | Burkitt | 104/172 B |
| 3,949,859 | 4/1976 | Nussbaumer et al. | 198/648 |

FOREIGN PATENT DOCUMENTS

| 609213 | 1/1935 | Fed. Rep. of Germany | 104/172 B |
| 98010 | 7/1980 | Japan | 198/648 |
| 899403 | 1/1982 | U.S.S.R. | 104/172 B |

Primary Examiner—Joseph E. Valenza
Assistant Examiner—Stuart J. Millman
Attorney, Agent, or Firm—Spencer T. Smith

[57]  ABSTRACT

A pallet conveyor assembly for moving, positioning, and transferring a heavy palletized load comprising a pallet, support means having a plurality of independent support modules each including a power driven closed loop vertically oriented link chain, the chain including engagement pins, means for supporting the pallet for displacement along the support means in a selected direction, pin engagement means mounted to the pallet including an engagement plate having a spaced pair of downwardly opening slots in which one of the engagement pins can be located, and spring means for biasing the engagement plate between an upper position whereat one of the slots can engage an engagement pin on the top run of the link chain, to a lower position, adjacent modules being selectively spaced and engagement pins being selectively located on the drive chain so that as a pallet is driven forwardly from one module to another an engagement pin of the one module will become disengaged from the front slot and an engagement pin of the other module will simultaneously engage the front slot when the engagement plate is at the lower position.

1 Claim, 3 Drawing Figures

Fig_1

PALLET CONVEYOR

BACKGROUND OF THE INVENTION

In conveyor systems for handling heavy palletized loads in a range of up to 15 tons, it is desirable to maintain a positive engagement of the pallet to the conveyor drive mechanism in order to control the velocity and accurate position of the load. It is also desirable to construct conveyor systems by means of independent modules in order to provide layout flexibility to extend their length and/or to accommodate special modules such as to crossover from one to another conveyor line as in an automatic machine tool loading and unloading system.

This invention relates to a pallet drive for moving and positioning heavily loaded pallets along a conveyor which drive can transfer the pallet between conveyor modules while maintaining positive engagement and control.

SUMMARY AND OBJECTS OF THE INVENTION

A pallet conveyor is comprised of a drive mechanism which positively engages one or more pallets to move and position the pallets along a conveyor. The pallet conveyor is further comprised of a means for transferring pallets from one conveyor module to another while maintaining positive engagement with the pallet as it transitions between the conveyor modules and their independent drive mechanisms.

It is, therefore, an object of the invention to provide a pallet conveyor.

It is further an object of the invention to provide a pallet conveyor which has means for positively moving and locating pallets along a conveyor.

It is further an object of the invention to provide a conveyor which can transfer pallets between conveyor modules.

It is further an object of the invention to provide a pallet conveyor which has a means for disengaging the pallet as the pallet engages the drive of another conveyor module.

It is also an object of the invention to provide a pallet conveyor which can engage and disengage a pallet as it enters and exits the conveyor at a fixed station.

DESCRIPTION OF THE PREFERRED EMBODIMENT

Figure 1:
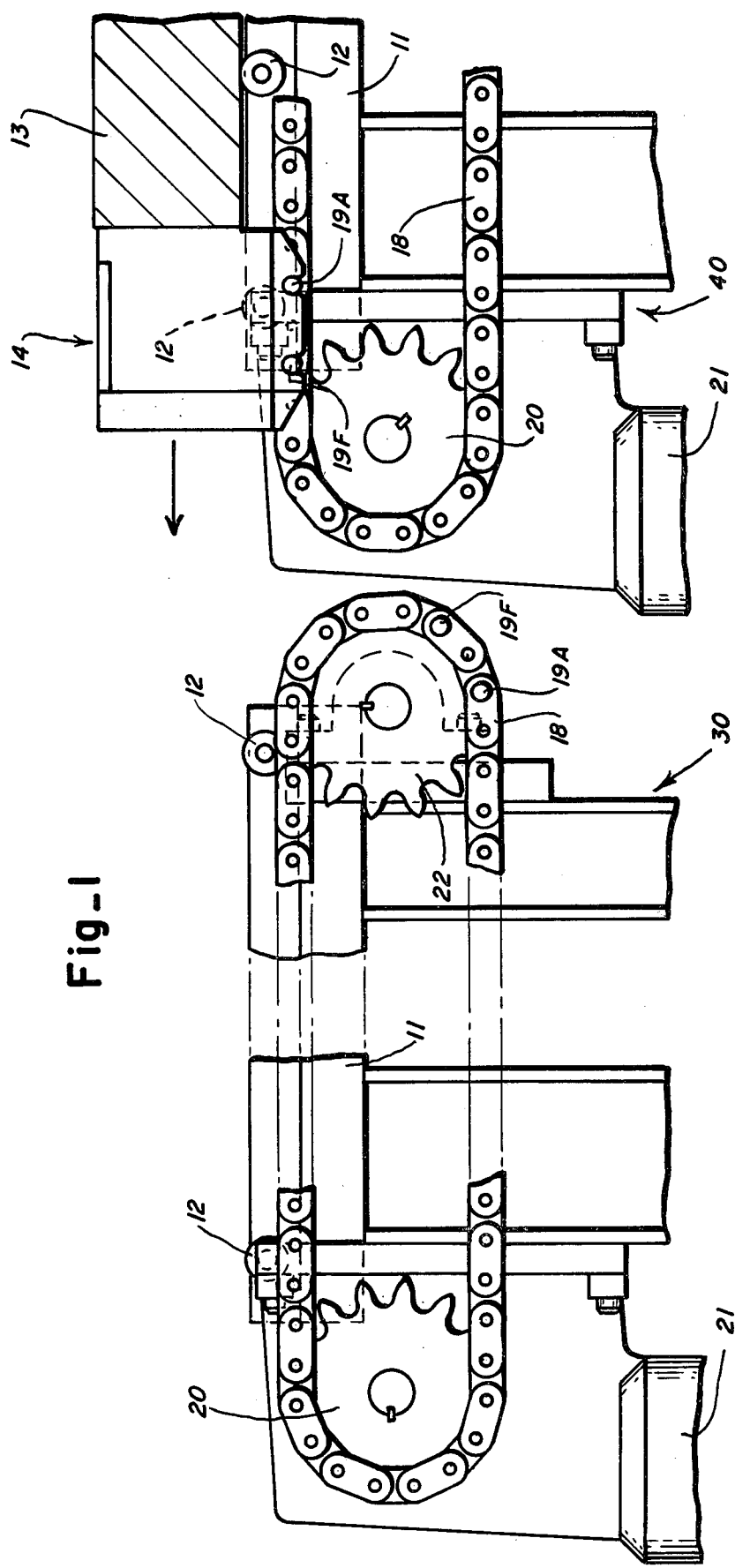
FIG. 1 is a partial side view of two conveyor modules and their respective pallet drives in accordance with the invention.

Referring to FIG. 1, the pallet conveyor is comprised of a plurality of conveyor modules 30 and 40, each including a frame 11 attached to which are rollers 12 supporting pallet 13 and any load (not shown) mounted thereto. The latch assembly 14 is mounted to pallet 13 and engages the link chain 18 through engagement pins 19F and 19A.

Figure 2:
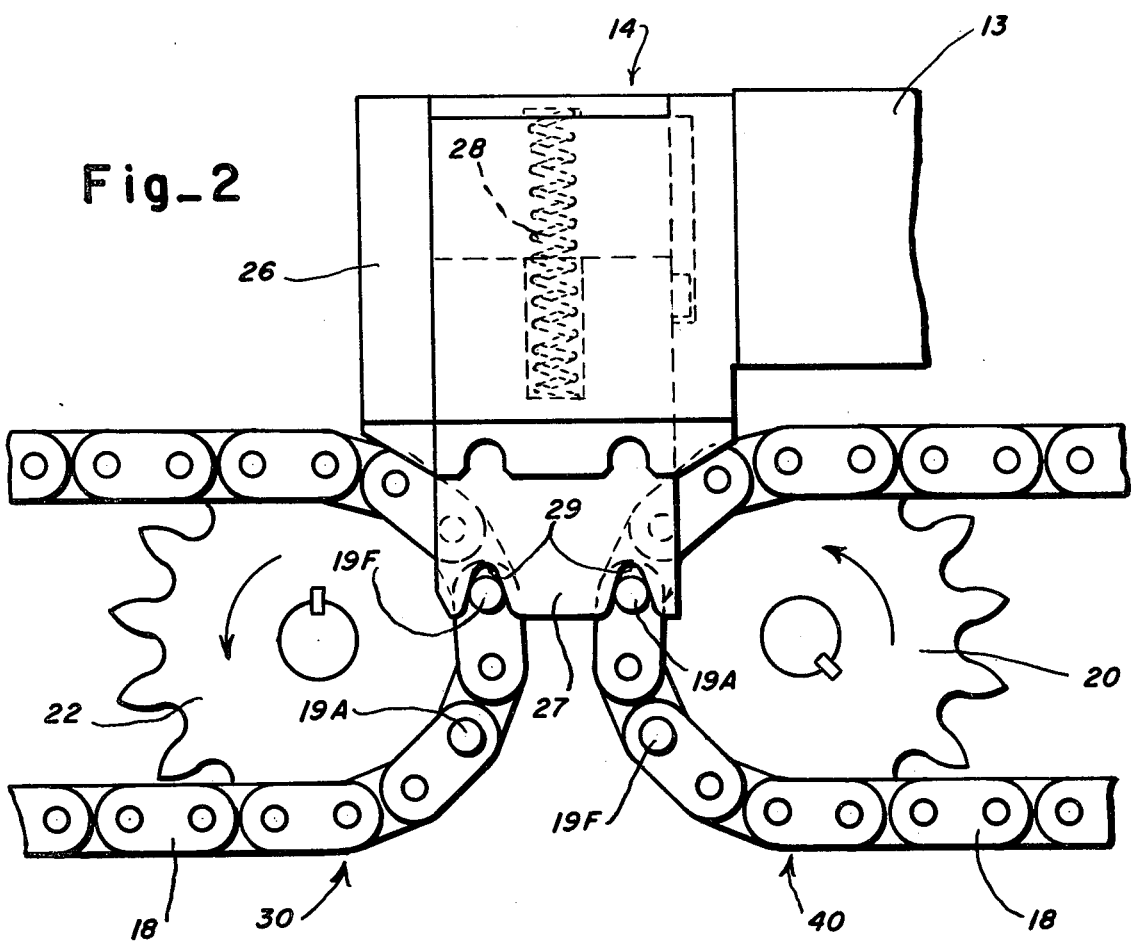
FIG. 2 is a view of the pallet latch assembly as it transfers between drives.

The sprockets 20 are driven by the motor/gearboxes 21 and cause the chains 18 to draw the pallet 13 across rollers 12. In FIG. 1, as power is applied to motor/gearbox 21 of conveyor module 40, the pallet 13 is moved right to left. As the latch assembly 14 approaches the area where the chains 18 of modules 30 and 40 are proximal each other, engagement pins 19F and 19A rotate about sprocket 20 thus reducing the horizontal velocity of pallet 13 and its load. By means of a position sensing switch (not shown), power is removed from motor/gearbox 21 of conveyor 40 when the latch assembly is centered between chains 18 of conveyors 30 and 40 as best seen in FIG. 2. At this point, pin 19F of conveyor module 40 has rotated out of engagement with latch assembly 14 and the latch assembly is positioned to accept pin 19F of module 30.

Power is then applied to motor/gearbox 21 of conveyor module 30 and its pin 19F engages latch 14 as the pins rotate about idler sprocket 22. Power is removed from motor/gearbox 21 of module 30 and applied to motor/gearbox 21 of module 40 disengaging pin 19A of module 40. Through the respective motor/gearboxes, power is removed from module 40 and re-applied to module 30, the pallet resumes its motion right to left, pin 19A of module 30 engages latch 14, and the sequence repeats.

Figure 3:
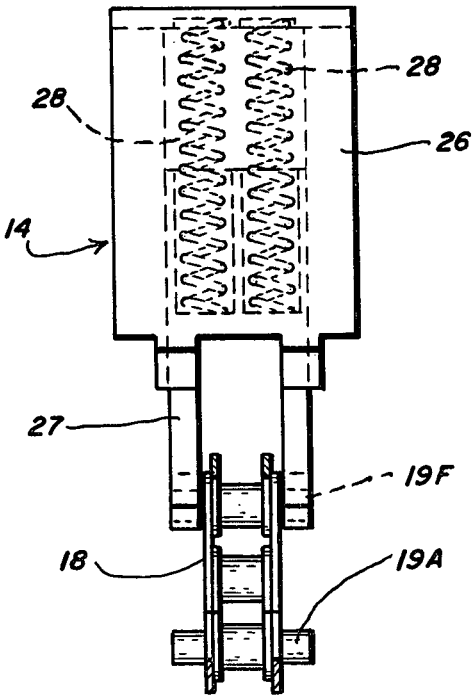
FIG. 3 is a side view of the latch assembly shown in FIG. 2.

The latch 14 engagement transfer between chains 18 of adjacent conveyor modules is accomplished without interruption or loss of positive engagement or control. The latch assembly 14 is comprised of a housing 26 in which is slidably housed engagement plate 27. The plate 27 functions to establish and maintain engagement with pins 19F and 19A of the link chains 18 by means of the downward opening slots 29 and extender springs 28. As the pins rotate about sprocket 20, best seen in FIGS. 2 and 3, the plate 27 is extended from housing 26 by springs 28 to maintain forceful engagement.

When the latch assembly is central to the chains 18, power is removed from motor/gearbox 21 of module 40 and applied to that of module 30 driving its engagement pin 19F and subsequently 19A into the slots 29 compressing springs 28 as the pin rotates about idler sprocket 22 disengaging pin 19A of module 40.

Pairs of pins 19F and 19A are spaced from each other along chain 18 so as to allow adjacent pallets to be engaged, maintain minimum clearance between pallets and drive a plurality of pallets on any one conveyor module.

When engaging the conveyor from a non-powered proximate support structure (not shown), the latch assembly 14 is positioned to engage pin 19F as it rotates about idler sprocket 22. When exiting unto a non-powered proximate support structure, pin 19A will disengage the latch assembly 14 at sprocket 20 leaving the pallet free.

What is claimed is:

1. A pallet conveyor assembly for moving, positioning, and transferring a heavy palletized load comprising
a pallet,
support means having a plurality of independent support modules each including
a power driven closed loop vertically oriented link chain, said chain including engagement pins,
means for supporting said pallet for displacement along said support means in a selected direction,
pin engagement means mounted to said pallet including
an engagement plate having a spaced pair of downwardly opening slots in which one of said engagement pins can be located, and spring means for biasing said engagement plate between an upper position whereat one of said slots can engage an engagement pin on the top run of said link chain, to a lower position, adjacent modules being selectively spaced and engagement pins being selectively located on said drive chain so that as a pallet is driven forwardly from one module to another an engagement pin of the one module will become disengaged from the front slot and an engagement pin of the other module will simultaneously engage the front slot when the engagement plate is at said lower position.

* * * * *